US012769316B2

(12) United States Patent
Esnault et al.

(10) Patent No.: US 12,769,316 B2
(45) Date of Patent: Oct. 20, 2026

(54) MAPPING AND SIMULTANEOUS LOCALISATION OF AN OBJECT IN AN INTERIOR ENVIRONMENT

(71) Applicant: ORANGE, Issy-les-moulineaux (FR)

(72) Inventors: Regis Esnault, Chatillon Cedex (FR); Pascal Pagani, Chatillon Cedex (FR)

(73) Assignee: ORANGE, Issy-les-moulineaux (FR)

( * ) Notice: Subject to any disclaimer, the term of this patent is extended or adjusted under 35 U.S.C. 154(b) by 347 days.

(21) Appl. No.: 17/252,008

(22) PCT Filed: May 24, 2019

(86) PCT No.: PCT/FR2019/051206
§ 371 (c)(1),
(2) Date: Dec. 14, 2020

(87) PCT Pub. No.: WO2019/239027
PCT Pub. Date: Dec. 19, 2019

(65) Prior Publication Data

US 2021/0263531 A1 Aug. 26, 2021

(30) Foreign Application Priority Data

Jun. 15, 2018 (FR) ...................................... 1855271

(51) Int. Cl.
*G05D 1/00* (2024.01)
*G01S 13/931* (2020.01)
(Continued)

(52) U.S. Cl.
CPC .......... *G05D 1/0274* (2013.01); *G01S 13/931* (2013.01); *G01S 15/931* (2013.01); *G05D 1/0242* (2013.01); *G09B 29/003* (2013.01)

(58) Field of Classification Search
CPC .... G05D 1/0274; G05D 1/0242; G05D 1/024; G05D 1/0231; G01S 13/931; G01S 15/931; G09B 29/003; G09B 29/00
See application file for complete search history.

(56) References Cited

U.S. PATENT DOCUMENTS 10,379,542 B2 8/2019 Bradai et al.
2012/0281507 A1* 11/2012 Rikoski .................. G01S 15/89 367/88
(Continued)

FOREIGN PATENT DOCUMENTS

FR 3025325 B2 3/2016
WO WO-2018089703 A1 * 5/2018 ............ B60R 11/04

OTHER PUBLICATIONS

Baig Q et al., "Online Localization and Mapping with Moving Objects Detection in Dynamic Outdoor Environments", Intelligent Computer Communication and Processing, 2009. ICCP 2009. IEEE 5th International Conference on, IEEE, Piscataway, NJ, USA, Aug. 27, 2009 (Aug. 27, 2009), pp. 401-408 (Year: 2009).*
(Continued)

*Primary Examiner* — Ig T An
(74) *Attorney, Agent, or Firm* — David D. Brush; Westman, Champlin & Koehler, P.A.

(57) ABSTRACT

A method for simultaneous localization and mapping of an object in an indoor environment, including autonomous location and mapping. The method includes generating a map of the indoor environment and determining movement of the object on the basis of data captured by the object, the localization and mapping method jointly generating the map and determining the movement. Ambiguity between two positions of an obstacle on a map during generation is thus resolved by taking into account the movement of the object generating the map, without the need for complex implementation elements.

18 Claims, 5 Drawing Sheets

(51) Int. Cl.
*G01S 15/931* (2020.01)
*G09B 29/00* (2006.01)

(56) References Cited

U.S. PATENT DOCUMENTS

| | | | | |
|---|---|---|---|---|
| 2015/0057871 | A1* | 2/2015 | Ono | G01C 21/34 701/23 |
| 2017/0261996 | A1* | 9/2017 | Trehard | G01S 17/931 |

OTHER PUBLICATIONS

K. Pahlavan et al., "Indoor Geolocation Science and Technology," in IEEE Communications Magazine, vol. 40, No. 2, pp. 112-118, Feb. 2002.

Do et al., "TDOA-based indoor positioning using visible light", Photon Netw Commun, DOI 10.1007/s11107-014-0428-4, Jan. 9, 2014.

H. Durrant-Whyte et al., "Simultaneous Localization and Mapping: Part I," in IEEE Robotics & Automation Magazine, vol. 13, No. 2, pp. 99-110, Jun. 2006.

English translation of the Written Opinion of the International Searching Authority dated Oct. 4, 2019 for corresponding International Application No. PCT/FR2019/051206, filed May 24, 2019.

Baig Q et al., "Online Localization and Mapping with Moving Objects Detection in Dynamic Outdoor Environments", Intelligent Computer Communication and Processing, 2009. ICCP 2009. IEEE 5th International Conference on, IEEE, Piscataway, NJ, USA, Aug. 27, 2009 (Aug. 27, 2009), pp. 401-408 ISBN: 978-1-4244-5007-7. XP031545073.

International Search Report dated Oct. 4, 2019 for corresponding International Application No. PCT/FR2019/051206, filed May 24, 2019.

Written Opinion of the International Searching Authority dated Oct. 4, 2019 for corresponding International Application No. PCT/FR2019/051206, filed May 24, 2019.

* cited by examiner

MAPPING AND SIMULTANEOUS LOCALISATION OF AN OBJECT IN AN INTERIOR ENVIRONMENT

CROSS-REFERENCE TO RELATED APPLICATIONS

This Application is a Section 371 National Stage Application of International Application No. PCT/FR2019/051206, filed May 24, 2019, the content of which is incorporated herein by reference in its entirety, and published as WO 2019/239027 on Dec. 19, 2019, not in English.

Field of the Disclosure

The invention relates to the simultaneous localization and mapping of an object in an indoor environment, and more particularly to autonomous localization and mapping.

PRIOR ART

Background of the Disclosure

Localization in an indoor environment is a major challenge for a large number of services and industry sectors. For example, factories of the future will require tracking of the movement of material, parts or packages, and the position of objects in the building will have to be known with great precision. On the other hand, the localization of people, which is nowadays customary outside buildings (for example using a smartphone equipped with a GPS chip), will have to continue with the same quality of service inside buildings, for example in order to guide users inside a shopping center. In addition, the deployment of autonomous robots is an application in which what is known as "indoor" localization is a major challenge.

In the context of "indoor" localization, the detection of the position of an object cannot generally rely on external services, such as the GPS navigation system. On the one hand, the signals transmitted by navigation systems are transmitted by satellites and are not generally received inside buildings. On the other hand, the precision achieved using navigation systems is from a few meters to a few tens of meters, and "indoor" localization applications require a much finer resolution.

Conventionally, localization in an "indoor" context is performed using a network of transceivers called beacons arranged inside the building, and whose location is known. The object to be localized is capable of regularly transmitting a radio signal that is able to be detected and identified by the network of beacons.

If the signal transmitted by the object to be localized is synchronized with the network of beacons, each beacon is capable of measuring the propagation time of the signal from the object to the beacon. This propagation time may be converted into a distance, knowing the propagation speed of the signal. The position of the object is finally obtained through trilateration, by calculating the intersection of the circles centered on each beacon and whose radius is equivalent to the distance from the object to the beacon. This type of localization is called time of arrival localization or time of arrival positioning. The scientific article by K. Pahlavan, Xinrong Li and J. P. Makela, "Indoor geolocation science and technology," in IEEE Communications Magazine, vol. 40, no. 2, pp. 112-118, February 2002, describes this method for localizing a communicating object on a wireless local area network (WLAN) based on access points. The major drawback of this technique is that it applies only to objects that already form part of a radio communication network for which a certain number of nodes have a known position, such as a mobile object in a Wi-Fi network.

If the signal transmitted by the object to be localized is not synchronized with the network of beacons, it is still possible to localize the object. In this case, it is not the propagation time of the signal to each beacon that is known, but the difference in the time of arrival of the signal between two beacons. The localization is then performed through trilateration by calculating the intersection of hyperbolas. This type of localization is called time difference of arrival localization or time difference of arrival positioning. The article by Do, TH. & Yoo, M., "TDOA-based indoor positioning using visible light", Photon Netw Commun (2014) 27: 80, describes one example of time difference of arrival localization, and also shows that the signal used for localization is not necessarily a radiofrequency signal; it is also possible to use infrared signals or visible light signals. However, this technique also requires the deployment of a network of beacons, which may be expensive and is not always available in the buildings under consideration. This constitutes a major drawback of the prior art.

In order to make do without the network of beacons, the most advanced technologies attempt to simultaneously localize the object and map its environment. Reference is then made to simultaneous localization and mapping, SLAM for short. This method is particularly advanced in the field of autonomous robots. The principles of the SLAM method are described for example in the article by H. Durrant-Whyte and T. Bailey, "Simultaneous localization and mapping: part I," in IEEE Robotics & Automation Magazine, vol. 13, no. 2, pp. 99-110, June 2006. To date, a great deal of work has been carried out in the field of algorithms in order to deal with the problems of uncertainty between the localization of the object and the aggregation of information about the environment. The most effective method for collecting data about the environment has yet to be defined.

In order to ascertain its environment, an object has to have an additional functionality dedicated to this task. For example, a camera will make it possible to analyze the image of the environment, but does not make it possible to measure distances. For this purpose, a sonar or radar device should be used. In this case, it is the echo of a transmitted signal that is analyzed, giving access to the distance from the obstacles. In order to perform complete mapping of the environment, and therefore to ascertain not only the distance from but the direction of the obstacles, a more complex device should be implemented, either by placing the radar or the sonar on a rotary axis, or using a network of a plurality of sensors (antennas or microphones) allowing analysis of the direction of arrival of the signal. All of these devices are complex and expensive, thereby constituting a major drawback of the prior art.

SUBJECT OF THE INVENTION

Summary

One of the aims of the present invention is to rectify drawbacks of the prior art.

One subject of the invention is a method for the simultaneous localization and mapping of an object in an indoor environment, comprising generating a map of the indoor environment and determining the movement of the object on the basis of data captured by the object, the localization and mapping method jointly generating the map and determining the movement.

The ambiguity between two positions of an obstacle on a map during generation is thus resolved by taking into account the movement of the object generating the map, without the need for complex implementation means.

Advantageously, the generation of the map at a given time depends on information relating to the movement detected at the given time.

Advantageously, generating the map comprises detecting an obstacle on the basis of a response signal received in response to transmission of a polling signal by the object.

Advantageously, generating the map comprises filtering, in the received response signal, the part resulting from the polling signal.

Advantageously, generating the map comprises discriminating the position of an obstacle on the basis of information relating to the detected movement from among a plurality of positions provided on the basis of the received response signal.

The map that is generated is thus more precise since it is generated solely from the echo resulting from the polling signal.

Advantageously, generating the map comprises weighting a detected obstacle by a probability when an obstacle detection detects a plurality of obstacles in the response signal received in response to transmission of a polling signal by the object, the probability associated with an obstacle being dependent, at the given time, on the amplitude of the received response signal resulting from the obstacle and on the detected movement information.

Advantageously, generating the map comprises dividing the map into a plurality of cells, a cell being associated with an obstacle.

Advantageously, generating the map comprises associating the obstacle having the highest probability with a cell of a map divided into a plurality of cells when a plurality of obstacles are detected for the cell.

The method according to the invention thus allows better mapping of an environment comprising a plurality of obstacles (walls, furniture, etc.).

Advantageously, according to one implementation of the invention, the various steps of the method according to the invention are implemented by a software or a computer program, this software comprising software instructions intended to be executed by a data processor of a device forming part of an object to be localized in an indoor environment and being designed to command the execution of the various steps of this method.

The invention therefore also targets a localization and mapping program comprising program code instructions for executing the steps of the localization and mapping method when said program is executed by a processor.

This program may use any programming language, and be in the form of source code, object code, or intermediate code between source code and object code, such as in a partially compiled form, or in any other desirable form.

Another subject of the invention is a device for the simultaneous localization and mapping of an object in an indoor environment, comprising a map generator for generating a map of the indoor environment and a movement analyzer for analyzing the movement of the object on the basis of data captured by the object, the localization and mapping device jointly implementing the map generator and the movement analyzer.

Another subject of the invention is a navigation device comprising

- a device for the simultaneous localization and mapping of an object in an indoor environment, and
- a computer capable of determining a path on the basis of the position of the object and the generated map provided by the device for the simultaneous localization and mapping of an object in an indoor environment.

Another subject of the invention is an object comprising:

- a transmitter for transmitting a polling signal;
- a receiver for receiving a response signal in response to transmission of the polling signal by the object;
- a device for the simultaneous localization and mapping of an object in an indoor environment.

Advantageously, the object comprises a screen capable of reproducing, in real time, the map generated by the device for the simultaneous localization and mapping of an object in an indoor environment.

Advantageously, the object comprises a navigation device according to the invention.

Advantageously, the object comprises a locomotor system including a controller capable of controlling at least one direction of the locomotor system on the basis of the path determined by the navigation device.

DESCRIPTION

Brief Description of the Drawings

The features and advantages of the invention will become more clearly apparent upon reading the description, given by way of example, and the attached figures, in which.

DETAILED DESCRIPTION OF ILLUSTRATIVE EMBODIMENTS

Figure 1:
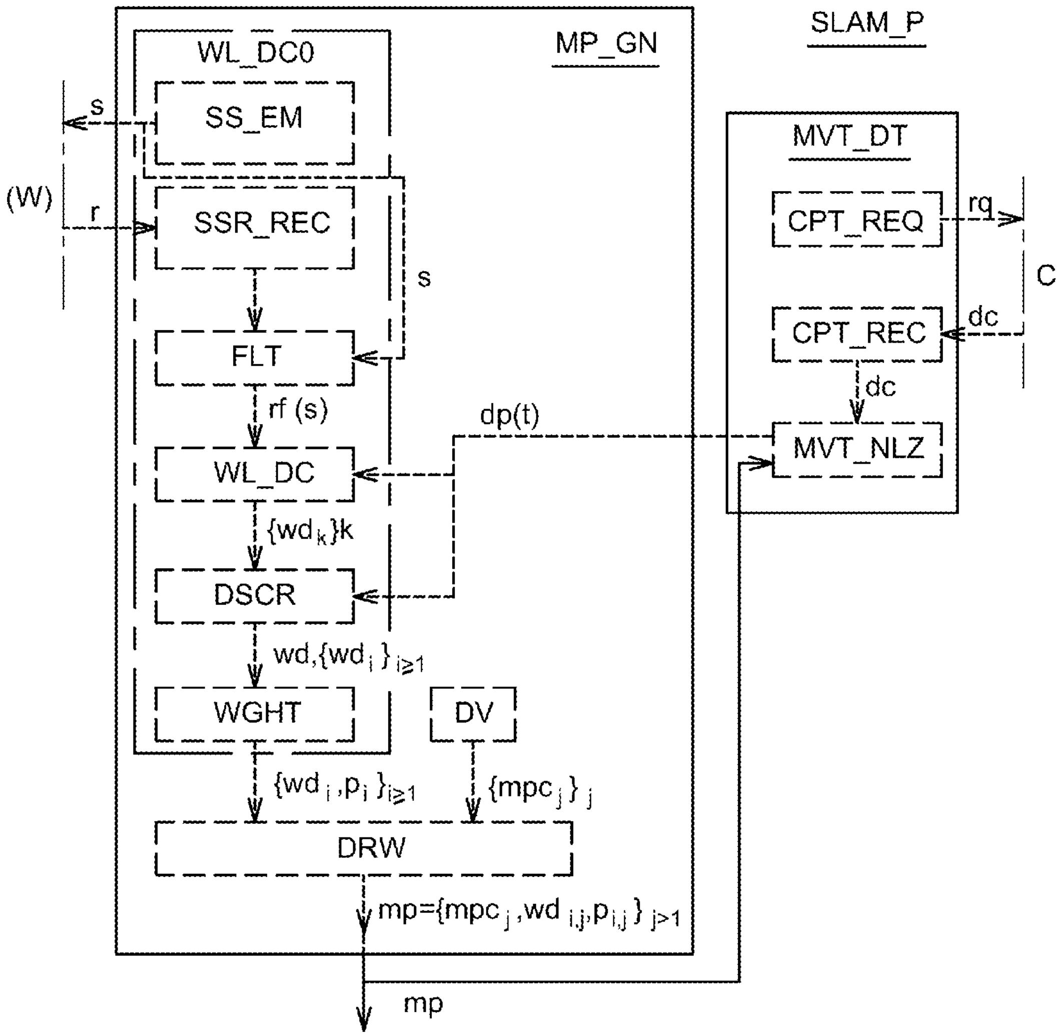
FIG. 1 shows a simplified diagram of the simultaneous localization and mapping method according to the invention.

FIG. 1 illustrates a simplified diagram of the simultaneous localization and mapping method according to the invention.

The method SLAM_P for the simultaneous localization and mapping of an object O in an indoor environment I comprises generating MP_GN a map of the indoor environment and determining MVT_DT the movement of the object on the basis of data captured by the object dc. The localization and mapping method SLAM_P jointly generates the map MP_GN and determines the movement MVT_DT.

Jointly is in particular understood to mean simultaneously, concomitantly.

In particular, the generation of the map MP_GN at a given time t depends on information relating to the movement detected at the given time dp(t). This information relating to the movement comprises in particular at least one item of data from among the following: direction of movement (in 2D or in 3D), speed of movement, starting point, position at the time t, etc.

In particular, generating the map MP_GN comprises detecting an obstacle WL_DC0, WL_DC on the basis of a response signal r received in response to transmission of a polling signal s by the object O.

In particular, generating the map comprises filtering, in the received response signal rr, the part resulting from the polling signal s. The filtering FLT therefore provides a filtered signal rf(s) in which the surrounding noise (not resulting from the polling signal) has been suppressed. The filtered signal rf(s) corresponds to the reflection(s) and/or refraction(s) and/or diffraction(s) of the transmitted polling signal s from one or more obstacles W.

In particular, generating the map MP_GN comprises discriminating DSCR the position of an obstacle wd, wdi on the basis of information relating to the detected movement dp(t) from among a plurality of positions {wdk}k provided on the basis of the received response signal rr.

In particular, generating the map MP_GN, in particular discriminating DSCR or detecting an obstacle WL_DC, resolves an ambiguity with regard to a position of an obstacle on the basis of information relating to the detected movement.

In particular, generating the map MP_GN comprises weighting WGHT a detected obstacle wdi by a probability pi when an obstacle detection WL_DC detects a plurality of obstacles in the response signal rr received in response to transmission of a polling signal s by the object. The probability pi associated with an obstacle wdi is dependent, at the given time t, on the amplitude a of the resulting response signal rr received from the obstacle and on the detected movement information.

In particular, generating the map MP_GN comprises dividing DV the map into a plurality of cells $mpc_j$. A cell $mpc_j$ is associated with an obstacle $wd_{ij}$.

In particular, generating the map MP_GN comprises associating DRW the obstacle $wd_{ij}$ having the highest probability $p_{ij}$ with a cell $mpc_j$ of a map mp divided into a plurality of cells when a plurality of obstacles $\{wd_{ij}\}_i$ are detected for the cell $mpc_j$.

In particular, determining the movement of the object MVT_DT comprises movement analysis capable of providing information relating to the movement of the object at a given time dp(t) on the basis of captured data.

In particular, determining the movement of the object MVT_DT comprises receiving captured data CPT_REC originating from at least one sensor C. The sensor(s) C is (are) for example at least one of the devices from among the following: a motion sensor, in particular an infrared motion sensor, an odometer, an accelerometer, a length meter, a compass, etc.

In particular, determining the movement of the object MVT_DT comprises triggering a movement measurement CPT_REQ, transmitting in particular a request rq to a sensor C. The requested sensor C transmits, in response to this request, captured data dc on the basis of which the movement dp(t) is determined. The sensor(s) C is (are) in particular at least one of the devices from among the following: a motion sensor, in particular an infrared motion sensor, an odometer, an accelerometer, a length meter, a compass, etc.

In particular, generating the map MP_GN comprises receiving SSR_REC the response to the polling signal r, resulting in particular from the polling signal encountering at least one obstacle W, such as a wall, a piece of furniture, or even, in the case of 3D mapping: a ceiling, a floor, etc.

In particular, generating the map MP_GN comprises transmitting SS_EM the polling signal s. The polling signal s may be a radio signal, electromagnetic signal, infrared signal, acoustic signal, etc.

One particular embodiment of the simultaneous localization and mapping method is a localization and mapping program comprising program code instructions for executing the steps of the simultaneous localization and mapping method when said program is executed by a processor.

Figure 2A:
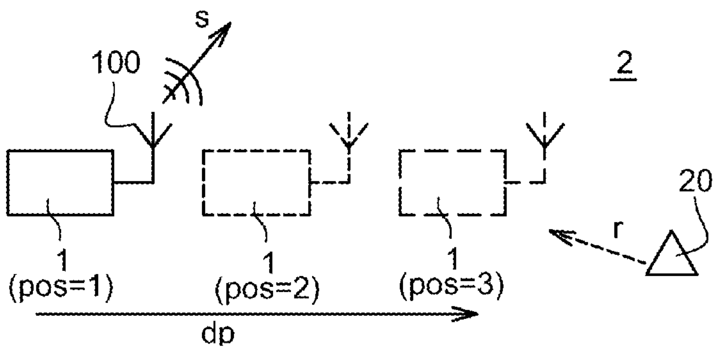
FIGS. 2*a*, 2*b* and 2*c* show simplified illustrations of the implementation of the invention in the case of an object taking three positions facing an obstacle, respectively movement of the object in the direction of the obstacle, pulsed polling responses for the three positions, and localization of the obstacle using the movement information.
Figure 2B:
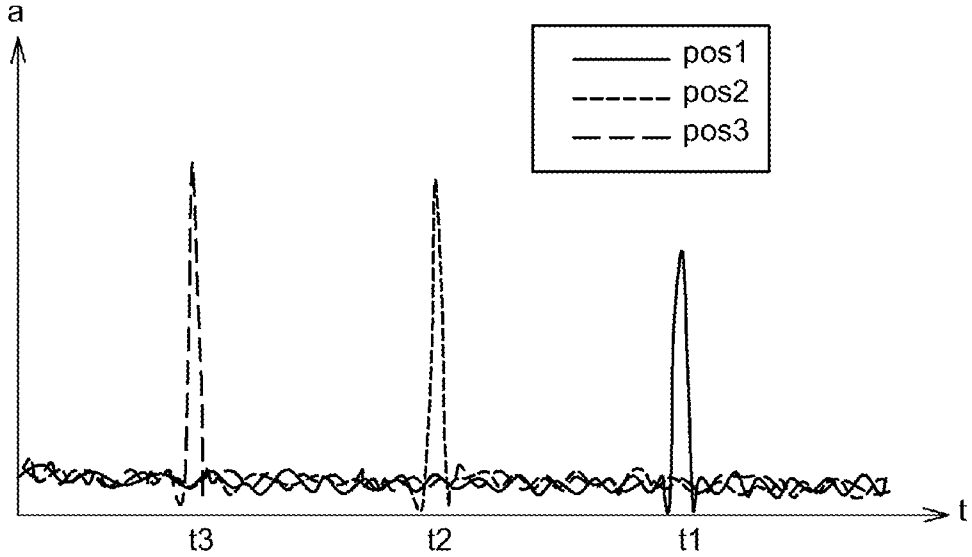
Figure 2C:
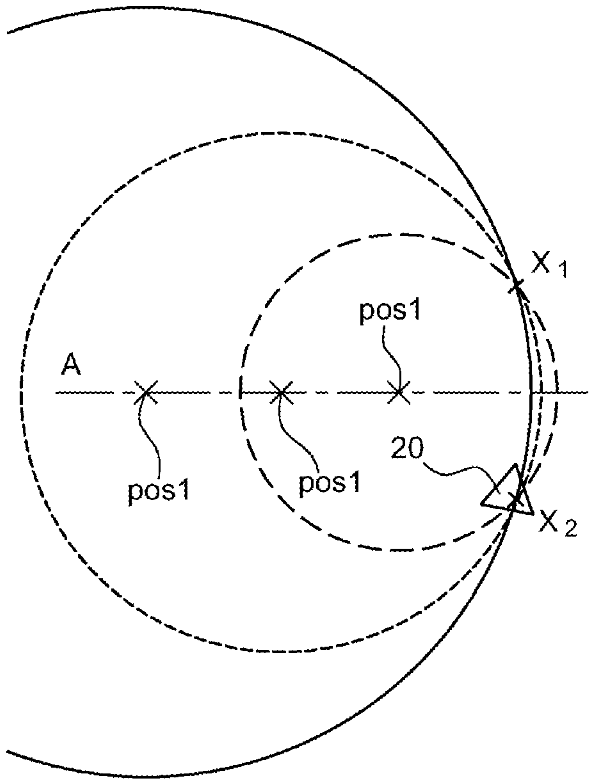

FIGS. 2*a*, 2*b* and 2*c* show simplified illustrations of the implementation of the invention in the case of an object taking three positions facing an obstacle.

FIG. 2*a* illustrates a movement of the object in the direction of the obstacle.

For example, the localization sensor is an antenna 100 transmitting a radio signal. When this signal s is transmitted in the environment 2, the propagation phenomena produce at least one echo r that is retransmitted in the direction of the antenna 100. The antenna 100 may then receive this (these) echo(es), and the localization and mapping device 12 (see FIG. 5) may analyze the round trip transmission time, and therefore the distance from the obstacles 20. This is "single-antenna radar" operation. The object 1 is just one example of a sensor for transmitting and receiving a wireless signal. Other techniques could be used, such as an acoustic signal (sonar) or infrared signal, for example.

If the object 1 equipped with a single transceiver sensor moves in the direction of an obstacle 20, at each position pos1, pos2, pos3, the object 1 is able to transmit a signal s. This signal s is called a polling signal. The object may then receive the echo r of this signal after reflection or diffraction from the obstacle 20 for each of these transmission positions pos1, pos2, pos3.

Analyzing the received signal r makes it possible to obtain the pulsed polling response illustrated in FIG. 2*b*, which represents the level of the echo as a function of the propagation time. It is thus possible to measure the round trip propagation time of the polling signal. By multiplying this round trip propagation time by c/2, where c is the propagation speed of the signal, the distance from the obstacle is obtained. This is radar operation.

FIG. 2*b* illustrates pulsed polling responses r for the three positions.

The responses r are shown on a graph having the reception time t on the abscissa and the amplitude a of the received response r on the ordinate. The durations t1, t2 and t3 that are shown are linked to the distances d1, d2 and d3 between the object 1 and the obstacle 20 at the positions pos1, pos2 and pos3 by the relationships:

$$d1=t1\times c/2, d2=t2\times c/2, et\ d3=t3\times c/2$$

At this stage, the polling performed by the sensor of the object 1 makes it possible to ascertain that the object 1 is currently approaching the obstacle 20, but does not give the direction of the obstacle 20. To determine the direction of the obstacle, the localization and mapping method according to the invention combines this single-sensor mapping information with the internal movement information of the object dp(t). This movement information may be obtained for example using an odometer or even using an accelerometer.

FIG. 2*c* illustrates localization of the obstacle using the movement information.

The knowledge of the relative position of the object 1 for the various polling positions pos1, pos2, pos3 may be combined with the information for evaluating the single-sensor distance so as to localize the obstacle 20. For this purpose, trilateration may be performed by the localization and mapping method. The trilateration consists in calculating the intersection of three circles centered on the positions pos1, pos2 and pos3, and whose radii correspond to the object-obstacle distances obtained for each position through polling.

FIG. 2*c* illustrates the application of the trilateration, by way of example, in a 2-dimensional situation. However, it may also be used if the localization is performed in 3 dimensions. In this case, the trilateration corresponds to evaluating an intersection of spheres.

It may be noted in the example of FIG. 2*c* that there is still a lateral ambiguity, since the three circles intersect at two points X1 and X2: at the obstacle 20 and at its point symmetrical about the axis A of movement of the object 1. This lateral ambiguity may be resolved as soon as the moving object 1 performs a non-rectilinear movement. Therefore, the movement information dp(t) of the object 1 will make it possible to determine the position of the obstacle 20 at the point X2.

Optionally, in order to facilitate this position discrimination DSCR, the localization and mapping method according to the invention comprises controlling the object 1 (not illustrated), sending in particular a one-off change direction command to the locomotor device of the object in order to allow this ambiguity to be resolved.

The example under consideration proposes to use the evaluations of distances at 3 separate points, but the trilateration may be performed based on evaluations of the distance that are performed at any number of points at least equal to 2. The distance from the obstacles may also be evaluated continuously, and the obstacle localization algorithm may choose to use all or some of the distance measurements performed in the mapping history, associated with the relative positions of the moving object. Thus, by using the localization and mapping method according to the invention, the more the object 1 moves in its environment 2, the more precise its representation of the obstacles surrounding it becomes.

Figure 3A:
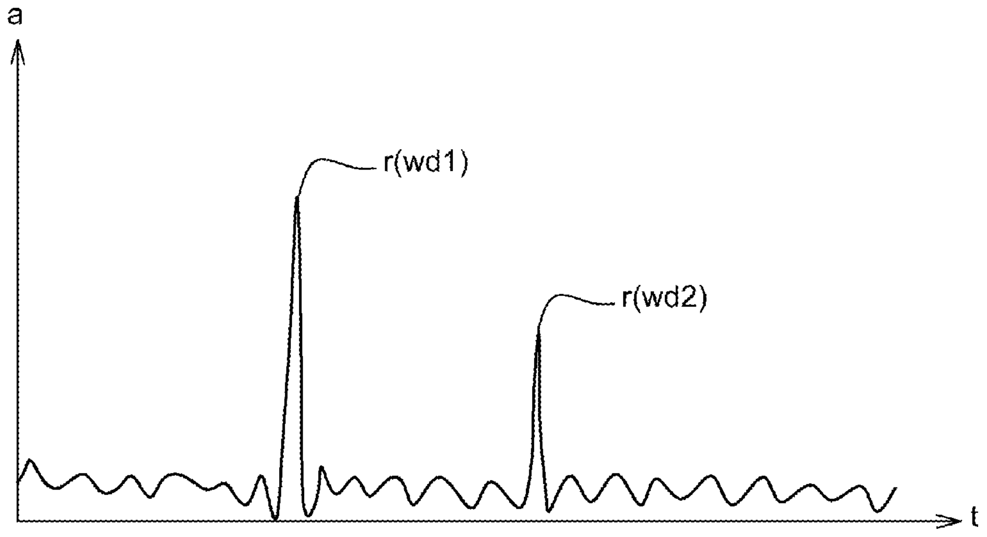
FIGS. 3*a*, 3*b* and 3*c* show simplified illustrations of the implementation of the invention in the case of a complex environment, that is to say comprising a plurality of obstacles, respectively a pulsed polling response obtained when the object is located close to two walls, a map of a complex environment (two walls) when the object is moving, a pulsed polling response in a complex case (3 obstacles)
Figure 3B:
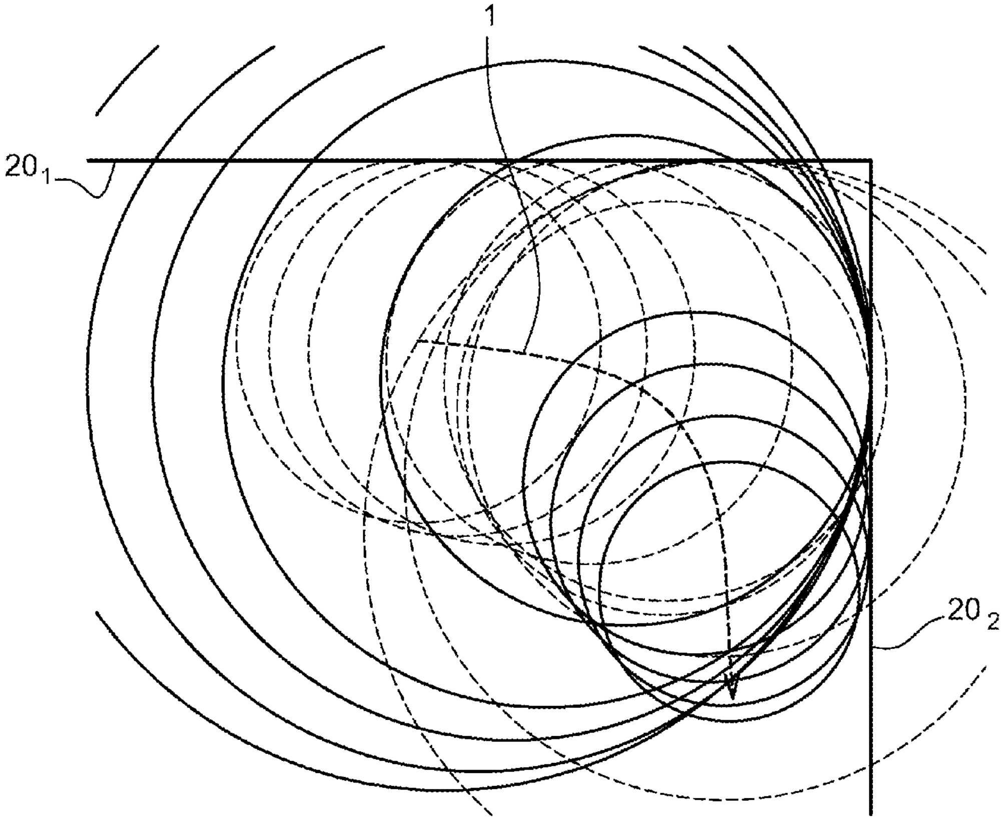
Figure 3C:
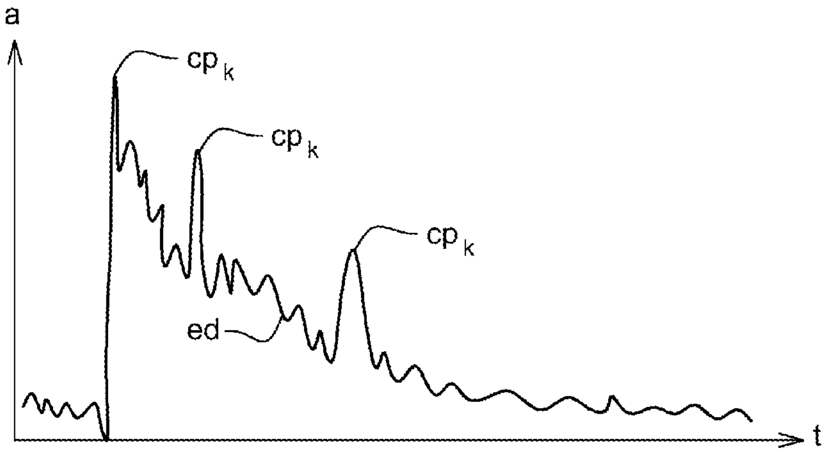

FIGS. 3*a*, 3*b* and 3*c* show simplified illustrations of the implementation of the invention in the case of a complex environment, that is to say comprising a plurality of obstacles.

The example of FIG. 2*c* illustrates the case in which the obstacle 20 to be identified is localized in a precise point in space. However, the invention applies in the same way when it is the whole of the environment 2 that should be mapped. By way of illustration, an object 1 is moving close to an angle formed by two perpendicular walls.

FIG. 3*a* illustrates a pulsed polling response obtained when the object is located close to two walls. The responses r are shown on a graph having the reception time t on the abscissa and the amplitude a of the received response r on the ordinate.

Using its single-sensor polling system, the object 1 constantly receives a pulsed polling response r formed of two peaks: this is the specular reflection from each of the walls. The pulsed polling response obtained at a given time during the movement is illustrated in FIG. 3*a*.

From the point of view of the mapping of the environment, this two-peak pulsed response is represented by two circles centered on the position of the object and whose radii correspond to the distances measured between the object and each of the walls, as shown in FIG. 3*b*.

FIG. 3*b* illustrates a map of a complex environment (two walls) when the object is moving.

These two circles are shown for various positions of the object 1 when it is moving: the dashed circle corresponds to the distance measured through reflection from the top wall $\mathbf{20}_1$, and the unbroken circle corresponds to the distance measured through reflection from the right-hand wall $\mathbf{20}_2$. The object 1 is not shown, rather only its movement line (dot-and-dash curve).

The successively measured circles tend to overlap at the location where each of the walls $\mathbf{20}_1$, $\mathbf{20}_2$ are located.

The localization and mapping method may use at least one method for accurately determining the position of the walls. By way of example, it is possible to divide DIV (cf. FIG. 1) the space of the environment map into small cells. The probability of a cell containing an obstacle (a wall, furniture) increases each time the cell is crossed by a distance measurement circle. As the object moves in its environment, cells that actually correspond to an obstacle obtain a very high probability. The object may at any time produce a partial map of the knowledge of its environment by applying a threshold to the probabilities obtained in each cell. The precision of this method increases as the object moves in the environment and thus polls the environment from different points of view. In particular, the movement in the environment makes it possible to resolve any lateral ambiguities.

This type of mapping is only possible because the object integrates the knowledge of its own movement and the elements for polling the environment that it possesses in the same process.

FIG. 3*c* illustrates a pulsed polling response in a complex case (3 obstacles).

In practical cases, the environment may be highly complex. On the other hand, all of the propagation phenomena may be caused by the retransmission of echoes: specular reflection, diffuse reflection, diffraction. The pulsed response thus does not always consist of distinct echo peaks, but may correspond to a continuous and decreasing profile representing the decreasing diffuse echo level ed as a function of the propagation time, with peaks corresponding to the primary echoes $ep_k$. One example of such a profile is shown in FIG. 3*c*.

In this situation, the above mapping method may still be applied. Instead of separate circles corresponding to the primary echoes $ep_k$, the environment map is supplied using continuous echo-level disks (obtained from the pulsed response). The probability of a cell of the map of the environment containing an obstacle increases with the echo level listed in this cell, by performing a summing function for these levels for various polling positions.

The function providing the probability of the presence of an obstacle in the environment map may take into account the various echo level profiles measured by the object, the relative position of the object during the measurement of this profile and the age of the profile measurement. This last point makes it possible to give more or less weight to older measurements, and is particularly important if the environment may be modified over time (for example if other moving objects are present in the environment).

Figure 4:
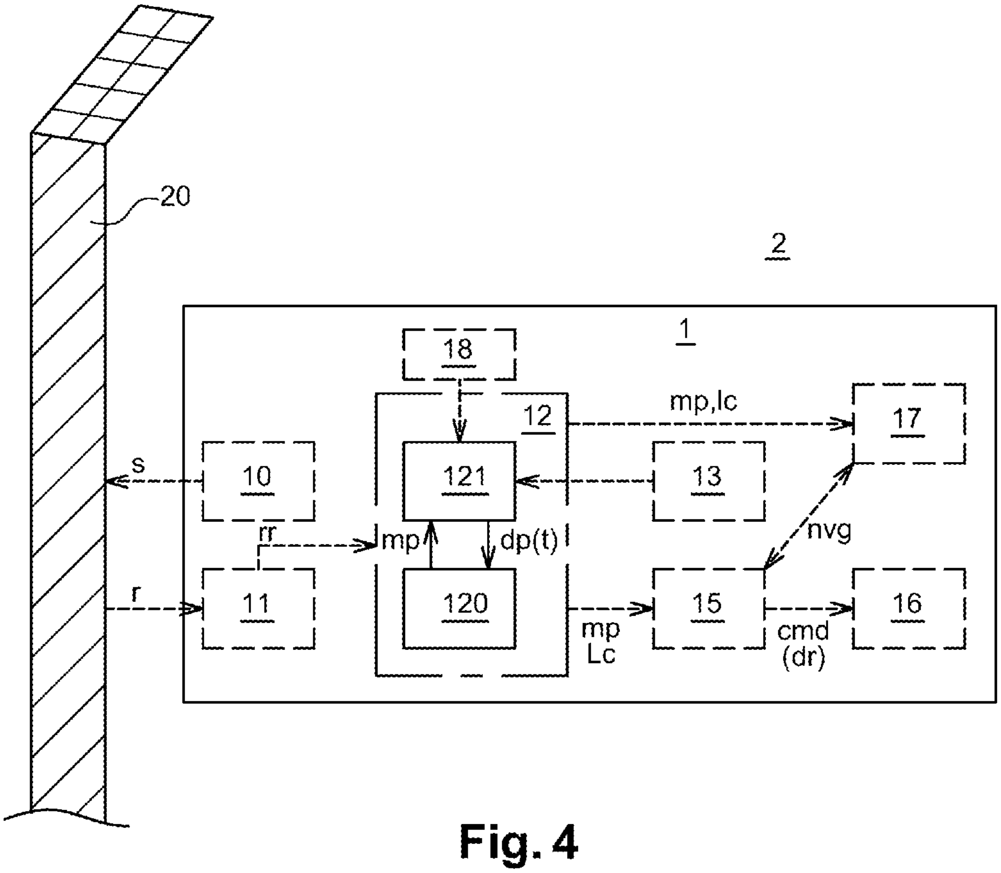
FIG. 4 shows a simplified diagram of an object according to the invention.

FIG. 4 illustrates a simplified diagram of an object according to the invention.

A device 12 for the simultaneous localization and mapping of an object 1 in an indoor environment 2 comprises a map generator 120 for generating a map of the indoor environment and a movement analyzer 121 for analyzing the movement of the object on the basis of data captured by the object 1. The localization and mapping device 12 jointly implements the map generator 120 and the movement analyzer 121.

Jointly is in particular understood to mean simultaneously, concomitantly.

An object 1 comprises:

a transmitter 10 for transmitting a polling signal s;

a receiver 11 for receiving a response signal r in response to transmission of the polling signal by the object 1;

a device 12 for the simultaneous localization and mapping of an object 1 in an indoor environment.

2.

The device 12 for the simultaneous localization and mapping of an object 1 comprises a map generator 120 for generating a map of the indoor environment and a movement analyzer 121 for analyzing the movement of the object on the basis of data captured by the object 1. The localization and mapping device 12 jointly implements the map generator 120 and the movement analyzer 121.

In particular, the object 1 comprises a screen 17 capable of reproducing, in real time, the map mp generated by the device 12 for the simultaneous localization and mapping of an object in an indoor environment. In particular, the screen 17 is furthermore capable of reproducing the position of the object 1 on the reproduced map on the basis of localization data provided by the localization and mapping device 12.

In particular, the object 1 comprises a navigation device 15.

In particular, the object 1 comprises a locomotor system 16 including a controller capable of controlling cmd(dr) at least one direction of the locomotor system 16 on the basis of the path nvg determined by the navigation device 15. Direction is understood to mean a device of a vehicle or a robot, autonomous in terms of movement, capable of modifying the direction of movement, in particular the direction of the wheels for a moving robot or vehicle.

In particular, the map generator 120 for generating the map at a given time t depends on information relating to the movement detected at the given time dp(t). This information relating to the movement comprises in particular at least one item of data from among the following: direction of movement (in 2D or in 3D), speed of movement, starting point, position at the time t, etc.

In particular, the map generator 120 comprises an obstacle detector (not illustrated) for detecting an obstacle on the basis of a response signal r received in response to transmission of a polling signal s by the object 1.

In particular, the map generator 120 comprises a filter (not illustrated) extracting, from the received response signal rr, the part resulting from the polling signal s. The filter therefore provides a filtered signal rf(s) in which the surrounding noise (not resulting from the polling signal) has been suppressed. The filtered signal rf(s) corresponds to the reflection(s) and/or refraction(s) and/or diffraction(s) of the transmitted polling signal s from one or more obstacles W.

In particular, the map generator 120 comprises a discriminator (not illustrated) for discriminating the position of an obstacle wd, wdi on the basis of information relating to the detected movement dp(t) from among a plurality of positions {wdk}k provided on the basis of the received response signal rr.

In particular, the map generator 120, in particular the discriminator or the obstacle detector, resolves an ambiguity with regard to a position of an obstacle on the basis of information relating to the detected movement.

In particular, the map generator 120 comprises a weighter (not illustrated) for weighting a detected obstacle wdi by a probability pi when an obstacle detection WL_DC detects a plurality of obstacles in the response signal rr received in response to transmission of a polling signal s by the object. The probability pi associated with an obstacle wdi is dependent, at the given time t, on the amplitude a of the resulting response signal rr received from the obstacle and on the detected movement information.

In particular, the map generator 120 comprises a divider (not illustrated) for dividing the map into a plurality of cells $mpc_j$. A cell $mpc_j$ is associated with an obstacle $wd_{ij}$.

In particular, the map generator 120 comprises a coupler (not illustrated) associating the obstacle $wd_{ij}$ having the highest probability $p_{ij}$ with a cell $mpc_j$ of a map mp divided into a plurality of cells when a plurality of obstacles $\{wd_{ij}\}_i$ are detected for the cell $mpc_j$.

In particular, the analyzer 121 for analyzing the movement of the object comprises a movement analyzer (not illustrated) capable of providing information relating to the movement of the object at a given time dp(t) on the basis of captured data.

In particular, the analyzer 121 for analyzing the movement of the object comprises a receiver (not illustrated) for receiving captured data originating from at least one sensor 18. The sensor(s) 18 is (are) for example at least one of the devices from among the following: a motion sensor, in particular an infrared motion sensor, an odometer, an accelerometer, a length meter, a compass, etc.

In particular, the analyzer 121 for analyzing the movement of the object comprises a trigger (not shown) for triggering a movement measurement, in particular transmitting a request rq to a sensor 18. The requested sensor 18, in response to this request, transmits captured data dc on the basis of which the movement dp(t) is determined. The sensor(s) 18 is (are) in particular at least one of the devices from among the following: a motion sensor, in particular an infrared motion sensor, an odometer, an accelerometer, a length meter, a compass, etc.

In particular, the map generator 120 comprises the receiver 11 for receiving the response to the polling signal r, resulting in particular from the polling signal encountering at least one obstacle 20, such as a wall, a piece of furniture, or even, in the case of 3D mapping: a ceiling, a floor, etc.

In particular, the map generator 120 comprises a transmitter 10 for transmitting the polling signal s. The polling signal s may be a radio signal, electromagnetic signal, infrared signal, acoustic signal, etc.

The object 1 is in particular a smartphone or a tablet, or a vehicle: bicycle, cart, transport trolley in a factory, an office building, etc., but also an autonomous object such as a robot, land or air drone, etc.

In one embodiment that is not illustrated, a navigation device 15 comprises.

the device 12 for the simultaneous localization and mapping of an object in an indoor environment, and a computer (not illustrated) capable of determining a path on the basis of the position of the object and the generated map provided by the device for the simultaneous localization and mapping of an object in an indoor environment.

The invention also targets a medium. The information medium may be any entity or device capable of storing the program. For example, the medium may comprise a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is able to implement a function or a set of functions in accordance with the above description. A hardware component corresponds to any element of a hardware assembly that is able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A method comprising:

performing simultaneous localization and mapping of an object in an indoor environment comprising:

transmitting a polling signal in the indoor environment using a transmitter of the object;

receiving a response signal in a form of a reflection of the transmitted polling signal using a receiver of the object; and generating a map of the indoor environment using a localization and mapping device based on the response signal and sensor data from at least one sensor of the object relating to detected movement of the object, the generation of the map and the detection of movement being performed jointly, wherein the map generation at a given instant is a function of the detected movement at the given instant, and comprising discriminating a position of an obstacle on the basis of information relating to the detected movement from among a plurality of positions provided on the basis of the received response signal, wherein generating said map comprises weighting a detected obstacle by a probability when a plurality of obstacles are detected at a given time in the response signal, the probability associated with an obstacle being dependent, at the given time, on an amplitude of the received response signal resulting from the obstacle and on the detected movement information; and navigating the object through the indoor environment using a navigating device based on the generated map.

2. The localization and mapping method as claimed in claim 1, wherein generating the map comprises detecting the obstacle on the basis of the response signal.

3. The localization and mapping method as claimed in claim 2, wherein generating the map comprises filtering, in the received response signal, a part resulting from the polling signal.

4. The localization and mapping method as claimed in claim 1, wherein generating the map comprises dividing the map into a plurality of cells, each cell being associated with an obstacle of the plurality of obstacles.

5. The localization and mapping method as claimed in claim 1, wherein generating the map comprises associating the obstacle having the highest probability with a cell of the map divided into the plurality of cells in response to a plurality of the obstacles being detected for the cell.

6. A non-transitory computer-readable medium comprising a localization and mapping program comprising program code instructions for executing a simultaneous localization and mapping of an object in an indoor environment when said program is executed by a processor of a device, wherein the instructions configure the device to:

perform simultaneous localization and mapping of an object in an indoor environment comprising:

transmitting a polling signal in the indoor environment using a transmitter of the object;

receiving a response signal in response to the transmission of the polling signal using a receiver of the object; and generating a map of the indoor environment and detect movement of the object both based on the response signal and sensor data from at least one sensor of the object relating to detected movement of the object, the generation of the map and the detection of movement being performed jointly, wherein the map generation at a given instant is a function of the detected movement at the given instant and comprises discriminating a position of an obstacle on the basis of information relating to the detected movement from among a plurality of positions provided on the basis of the received response signal, wherein generating said map comprises weighting a detected obstacle by a probability when a plurality of obstacles are detected at a given time in the response signal, the probability associated with an obstacle being dependent, at the given time, on an amplitude of the received response signal resulting from the obstacle and on the detected movement information; and navigate the object through the indoor environment using a navigating device based on the generated map.

7. An apparatus comprising:

a localization and mapping device for simultaneous localization and mapping of an object in an indoor environment, the device comprising:

a processor; and a non-transitory computer-readable medium comprising instructions stored thereon which when executed by the processor configure the device to:

perform simultaneous localization and mapping of an object in an indoor environment comprising:

transmitting a polling signal in the indoor environment using a transmitter of the object;

receiving a response signal in response to the transmission of the polling signal using a receiver of the object; and generating a map of the indoor environment and detect movement of the object both based on the response signal and sensor data from at least one sensor of the object relating to detected movement of the object, the generation of the map and the detection of movement being performed jointly, wherein the map generation at a given instant is a function of the detected movement at the given instant and comprises discriminating a position of an obstacle on the basis of information relating to the detected movement from among a plurality of positions provided on the basis of the received response signal, wherein generating said map comprises weighting a detected obstacle by a probability when a plurality of obstacles are detected at a given time in the response signal, the probability associated with an obstacle being dependent, at the given time, on an amplitude of the received response signal resulting from the obstacle and on the detected movement information; and navigate the object through the indoor environment using a navigating device based on the generated map.

8. The apparatus as claimed in claim 7, wherein the apparatus is a navigation device comprising:

the localization and mapping device; and a computer configured to determine a path on the basis of a position of the object and the generated map provided by the localization and mapping device.

9. The apparatus as claimed in claim 7, wherein the object comprises the localization and mapping device.

10. The apparatus as claimed in claim 9, wherein the object comprises a screen capable of reproducing, in real time, the map generated by the localization and mapping device.

11. The apparatus as claimed in claim 9, wherein the object comprises the navigation device.

12. The apparatus as claimed in claim 11, wherein the object comprises a locomotor system including a controller configured to control at least one direction of the locomotor system on the basis of a path determined by the navigation device on the basis of a position of the object and the generated map provided by the localization and mapping device.

13. The localization and mapping method as claimed in claim 1, further comprising:

obtaining internal movement information indicating a direction of movement of the object using the sensor data; and discriminating the position of the obstacle includes discriminating the position of the obstacle on the basis of the internal movement information.

14. The apparatus as claimed in claim 7, wherein generating the map comprises detecting the obstacle on the basis of the response signal.

15. The apparatus as claimed in claim 14, wherein generating the map comprises filtering, in the received response signal, a part resulting from the polling signal.

16. The apparatus as claimed in claim 7, wherein generating the map comprises dividing the map into a plurality of cells, each cell being associated with an obstacle of the plurality of obstacles.

17. The apparatus as claimed in claim 7, wherein generating the map comprises associating the obstacle having the highest probability with a cell of the map divided into the plurality of cells in response to a plurality of the obstacles being detected for the cell.

18. The apparatus as claimed in claim 7, configured to:

obtain internal movement information indicating a direction of movement of the object using the sensor data; and wherein discriminating the position of the obstacle includes discriminating the position of the obstacle on the basis of the internal movement information.

* * * * *